US010483888B2

(12) United States Patent
Rozman et al.

(10) Patent No.: US 10,483,888 B2
(45) Date of Patent: Nov. 19, 2019

(54) PERMANENT MAGNET SYNCHRONOUS GENERATOR BASED DIRECT CURRENT POWER GENERATING SYSTEM

(71) Applicant: Hamilton Sundstrand Corporation, Charlotte, NC (US)

(72) Inventors: Gregory I. Rozman, Rockford, IL (US); Steven J. Moss, Rockford, IL (US); Andrew Baker, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/053,097

(22) Filed: Aug. 2, 2018

(65) Prior Publication Data

US 2018/0339593 A1    Nov. 29, 2018

Related U.S. Application Data

(62) Division of application No. 14/974,372, filed on Dec. 18, 2015, now abandoned.

(51) Int. Cl.
| | |
|---|---|
| *H02P 9/00* | (2006.01) |
| *H02P 6/16* | (2016.01) |
| *B60L 50/12* | (2019.01) |

(52) U.S. Cl.
CPC ............. *H02P 9/009* (2013.01); *B60L 50/12* (2019.02); *H02P 6/16* (2013.01)

(58) Field of Classification Search
CPC ...... B60W 10/08; B60W 20/00; B60W 10/06; B60W 10/02; B60W 10/26
See application file for complete search history.

(56) References Cited

U.S. PATENT DOCUMENTS

| 5,155,696 A | 10/1992 | Shibata et al. |
| 5,760,562 A | 6/1998 | Woodland et al. |
| (Continued) | | |

FOREIGN PATENT DOCUMENTS

GB    2468696 A    9/2010

OTHER PUBLICATIONS

Ellis, George et al. "Observer-based Resolver Conversion in Industrial Servo Systems", Internet Citation, Jun. 21, 2001, XP-002425518, Retrieved from the Internet: URL: http://www.motionvillage.com/welcome_center/articles/pcim2001rd_observer.pdf, 6 pages.

(Continued)

*Primary Examiner* — Tony Tran
(74) *Attorney, Agent, or Firm* — Cantor Colburn LLP (57) ABSTRACT

A method of compensating for rotor position error of a rotor of a permanent magnet synchronous generator (PMG) that provides electrical power to a direct current (DC) power generating system, the method including obtaining PMG phase voltages and resolver processed angular position output when the PMG is driven by a prime mover. Once obtained, a PMG fundamental phase voltage waveform is selected by eliminating higher order harmonics. A mechanical angle of the rotor is then converted into an electrical angle, then the electrical angle is aligned within the mechanical angle with a corresponding PMG fundamental phase voltage angle by adjusting offset to the electrical angle. After alignment, a plurality of resolver error offset values associated with the electrical angle are stored and additional values to the compensation table are added by interpolating data between two corresponding resolver error offset values of the plurality of resolver error offset values.

1 Claim, 6 Drawing Sheets

(56) References Cited

U.S. PATENT DOCUMENTS

| | | |
|---|---|---|
| 5,949,359 A | 9/1999 | Vlahu |
| 6,084,376 A | 7/2000 | Piedl et al. |
| 6,255,794 B1 | 7/2001 | Staebler |
| 6,389,373 B1 | 5/2002 | Ohya |
| 7,047,145 B2 | 5/2006 | Ishizuka et al. |
| 7,294,988 B2 | 11/2007 | Ajima et al. |
| 7,362,070 B2 | 4/2008 | Games et al. |
| 7,469,193 B2 | 12/2008 | Cheng |
| 7,659,688 B2 | 2/2010 | Schulz et al. |
| 8,239,154 B2 | 8/2012 | Cheng |
| 8,288,977 B2 | 10/2012 | Niimi |
| 8,686,671 B2 | 4/2014 | Jeon et al. |
| 8,898,030 B2 | 11/2014 | Ihm et al. |
| 9,059,732 B2 | 6/2015 | Courtney |
| 9,116,019 B2 | 8/2015 | Kim et al. |
| 2008/0309267 A1 | 12/2008 | Cheng |
| 2012/0303199 A1* | 11/2012 | Oba ................ B60K 6/445 |
| | | 701/22 |
| 2014/0361720 A1 | 12/2014 | Miyachi et al. |
| 2015/0035520 A1 | 2/2015 | Roesner et al. |
| 2015/0100264 A1 | 4/2015 | Qian |
| 2015/0158396 A1 | 6/2015 | Walters et al. |
| 2017/0174085 A1 | 6/2017 | Rozman et al. |

OTHER PUBLICATIONS

Extended European Search Report for application No. 16205066.0-1806 dated May 11, 2017, 10 pages.

\* cited by examiner

PERMANENT MAGNET SYNCHRONOUS GENERATOR BASED DIRECT CURRENT POWER GENERATING SYSTEM

CROSS REFERENCE TO RELATED APPLICATIONS

This application is a Divisional Application of U.S. Non-Provisional application Ser. No. 14/974,372, filed Dec. 18, 2015, which is incorporated by reference in its entirety herein.

BACKGROUND

The present disclosure relates to a direct current power generating system, and more particularly, to a resolver error compensation technique of a PMG-based direct current power generating system and method of operating.

Permanent magnet synchronous generators (PMG) are used in electric power generating system for electric or hybrid-electric vehicles. A generator control unit (GCU) is used to convert variable alternate current (AC) voltage at the output of the PMG into constant direct current (DC) voltage to supply vehicle loads. GCU contains a pulse-width modulate (PWM) converter (i.e. active rectifier) that may require accurate information about PMG rotor angular position for proper commutation of active rectifier switches.

Rotor angle may be detected by a resolver. In high power density applications, the PMG (with a high number of poles) coupled with a frameless two pole resolver may be used. Output of the resolver may be an electrical signal that corresponds to rotor angle. Resolver outputs may be sine and cosine analog signals that, when provided to a resolver-to-digital converter (RDC) may produce a digital output corresponding to the rotor's absolute angular position.

Various sources of angle error in the output signal of the resolver may include mechanical misalignment, electrical characteristics and conversion time errors. These errors with a multi-pole PMG may significantly aggravate accuracy of electrical angle that should be within at least one degree to obtain good control of the power generating system. Field oriented control of an active rectifier coupled to the PMG may not be accurately implemented over the entire speed range without knowing the actual position of the PMG rotor. It is therefore desirable to compensate resolver output error caused by misalignment and electrical sources of error.

SUMMARY

A method of compensating for rotor position error of a rotor of a permanent magnet synchronous generator (PMG) that provides electrical power to a direct current (DC) power generating system according to one, non-limiting, embodiment of the present disclosure includes obtaining PMG phase voltages and resolver processed angular position output signals by a resolver-to-digital (R/D) converter of the DC power generating system when the PMG is driven by a prime mover; selecting a PMG fundamental phase voltage waveform by eliminating higher order harmonics; converting a mechanical angle of a rotor into an electrical angle by an electrical angle and frequency derivation component of the DC power generating system; aligning the electrical angle within the mechanical angle with a corresponding PMG fundamental phase voltage angle by adjusting offset to the electrical angle; storing a plurality of resolver error offset values associated with the electrical angle into a computer readable storage medium of a digital signal processor (DSP) component; and adding additional values to the compensation table by interpolating data between two corresponding resolver error offset values of the plurality of resolver error offset values by a computer processor of the DSP component.

Additionally to the foregoing embodiment, the method includes running the prime mover at a pre-determined speed before obtaining the PMG phase voltages.

In the alternative or additionally thereto, in the foregoing embodiment, the method includes feeding an excitation signal to a resolver rotor coil; feeding sinusoidal and cosine-shaped signals from respective coils of a resolver associated with a rotor of the PMG; deriving angular and speed values by the R/D converter; and feeding the angular and speed values to the DSP component before running the prime mover.

In the alternative or additionally thereto, in the foregoing embodiment, the resolver comprises a two-pole resolver.

In the alternative or additionally thereto, in the foregoing embodiment, the resolver is frameless.

In the alternative or additionally thereto, in the foregoing embodiment, the PMG includes about twenty-eight poles.

A vehicle according to another, non-limiting, embodiment includes a prime mover; a PMG including a rotor coupled to the prime mover for rotation; a resolver including an excitation coil, a first coil and a second coil positioned approximately ninety degrees from the first coil, and wherein the excitation coil and the first and second coils are associated with the rotor; a resolver processing and compensation system configured to receive sinusoidal and cosine-shaped analog signals from the respective first and second coils, convert the analog signals to a digital signal corresponding to an absolute angular position of the rotor, and compensate for angular position error; a DC electrical load configured to receive DC power from the resolver processing and compensation system; and a vehicle supervisory controller configured to manage DC power distribution.

Additionally to the foregoing embodiment, the DC electrical load comprises an electric traction drive.

In the alternative or additionally thereto, in the foregoing embodiment, the vehicle is an electric automobile.

In the alternative or additionally thereto, in the foregoing embodiment, the vehicle is a hybrid automobile.

In the alternative or additionally thereto, in the foregoing embodiment, the prime mover is an internal combustion engine.

In the alternative or additionally thereto, in the foregoing embodiment, the resolver processing and compensation system includes a computer readable storage medium configured to store a speed compensation table and a position compensation table for storing offset data associated with the angular position error and used by a computer processor of the resolver processing and compensation system to expand the respective speed and position compensation tables by interpolating the stored offset data.

A DC power generating system according to another, non-limiting, embodiment includes a PMG including a rotor; a resolver including an excitation coil, a first coil and a second coil positioned approximately ninety degrees from the first coil, and wherein the excitation coil and the first and second coils are associated with the rotor; an excitation component configured to electrically excite the excitation coil; a resolver-to-digital converter configured to receive first and second analog signals from the respective first and second coils and convert the first and second analog signals to respective digital rotor angle and digital rotor speed signals; and a digital signal processor component configured to receive the digital rotor angle signal and the digital rotor speed signal, convert to an electrical angle and compensate for angular position error of the rotor.

Additionally to the foregoing embodiment, the digital signal processor component includes a computer processor, and a computer readable storage medium configured to store a speed compensation table and a position compensation table for storing offset data associated with the angular position error and used by the computer processor to expand the respective speed and position compensation tables by interpolating the stored offset data.

In the alternative or additionally thereto, in the foregoing embodiment, the angular position error includes a position angle error and a speed angle error.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
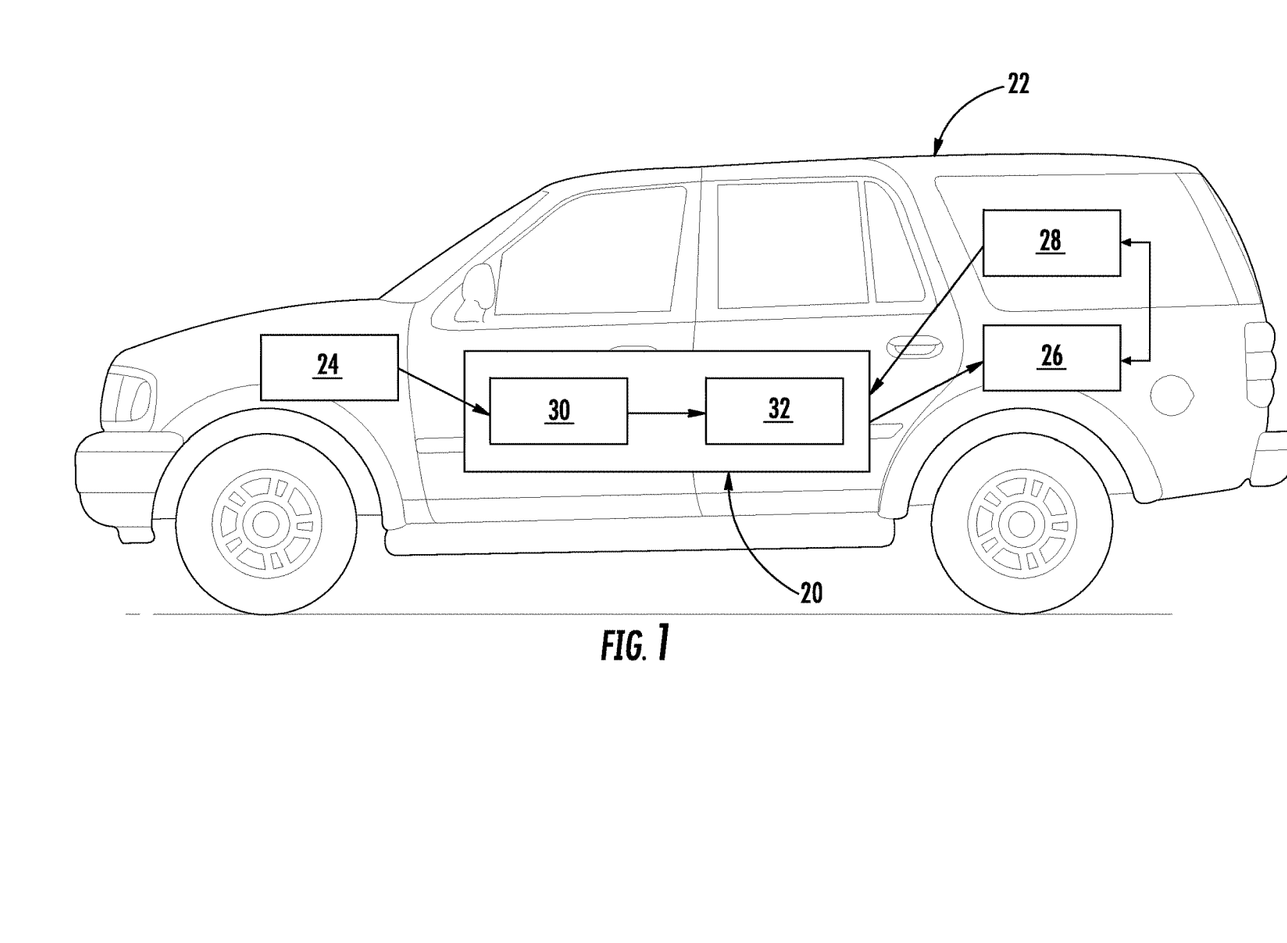
FIG. 1 is a schematic of a vehicle including a, non-limiting, embodiment of a power generating system of the present disclosure.

Referring to FIG. 1, an exemplary embodiment of an electric power generating system 20 of the present disclosure is illustrated. The electric power generating system 20 may be a DC power generating system and may be applied to vehicles 22 such as, for example, automobiles. The vehicle 22 may be an electrically powered vehicle, a hybrid vehicle and others. As illustrated, the DC power generating system 20 may be driven or powered by a prime mover 24, and may provide electrical power to various electrical loads 26 of the vehicle 22. A vehicle supervisory controller 28 (i.e., computer) may monitor the vehicle DC loads 26 and communicate with the power generating system 20 to manage and control power distribution. The DC power generating system 20 may include a permanent magnet synchronous generator (PMG) 30 and a generator control unit (GCU) 32 used to convert variable alternate current (AC) voltage at an output of the PMG 30 into a constant direct current (DC) voltage to supply power to the vehicle loads 26. Non-limiting examples of the prime mover 24 may include an internal combustion engine (i.e., for hybrid vehicles as one example), and electric motors (i.e., for electric vehicles). Non-limiting examples of vehicle loads 26 may include electric drive pumps, fans, export inverters (i.e., to support 60 Hz and 400 Hz loads, and electric traction drives powered by a high voltage DC bus (not shown).

Figure 2:
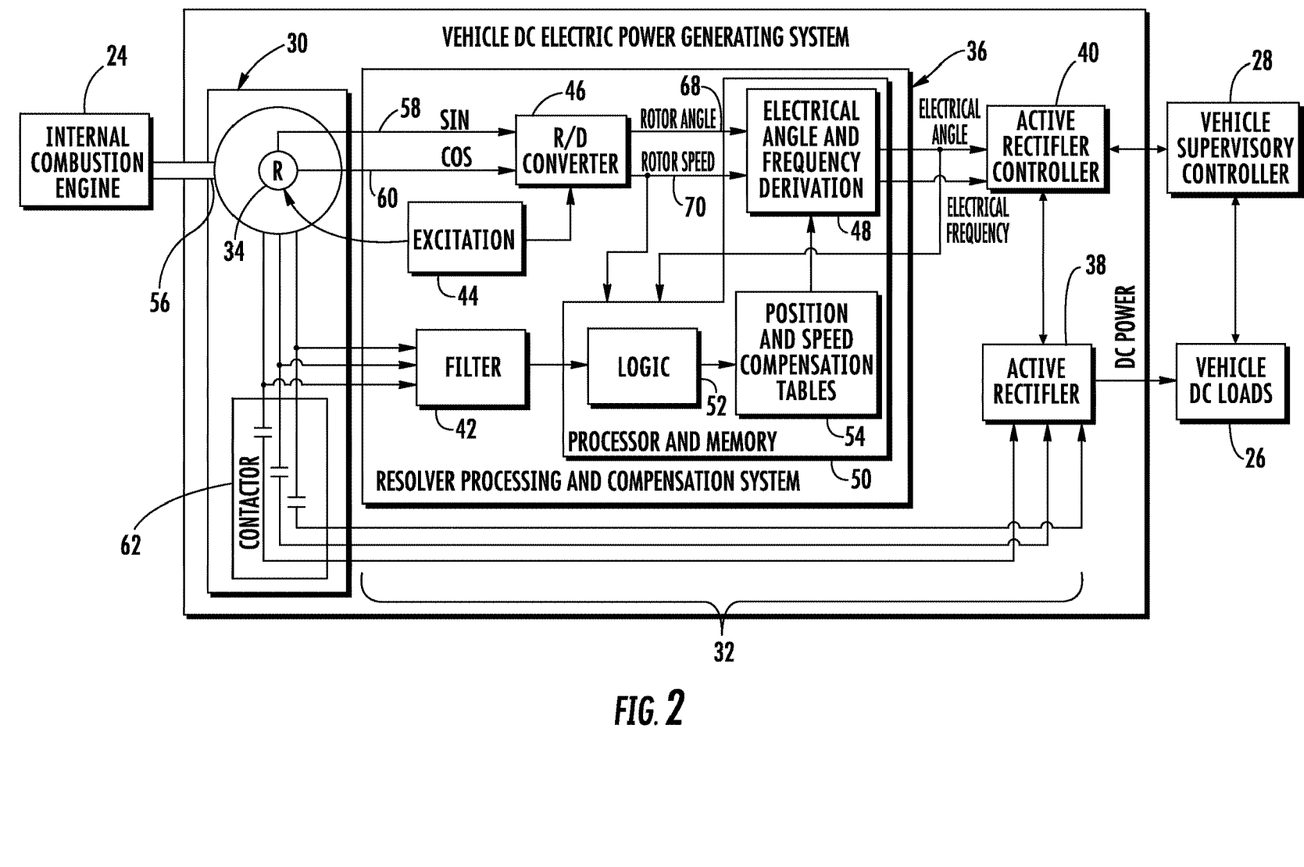
FIG. 2 is a schematic of the power generating system.

Referring to FIG. 2, the GCU 32 may include a resolver 34, a resolver processing and compensation system 36, an active rectifier 38, and an active rectifier controller 40. The resolver and compensation system 36 may include a filter 42 an excitation component 44, a resolver-to-digital (R/D) converter 46, and a digital signal processor (DSP) component 50 that may include an electrical angle and frequency derivation component 48, a computer processor 52 (e.g., microprocessor) and a computer readable storage media or memory 54.

The resolver 34 may be located inside a housing (not shown) of the PMG 30. The resolver 34 and the resolver processing and compensation system 36 are configured to provide position information of a rotor 56 of the PMG 30. The rotor position information is generally needed for the implementation of a field orientated control algorithm that facilitates the commutating of switches (not shown) of the active rectifier 38. The resolver 34 may generally be frameless and may be a two-pole resolver.

The resolver 34 may output an electrical signal that corresponds to rotor angle. The electrical signal output of the resolver 34 may include sine and cosine analog signals (see respective arrows 58, 60) sent to the R/D converter 46 of the resolver processing and compensation system 36. The R/D converter 46 outputs a digital output signal corresponding to the absolute angular position of the rotor 56. The resolver 34 may be a two-pole resolver that corresponds to a mechanical angle from zero (0°) to three hundred sixty degrees (360°) of the rotor 56. For proper commutation of a multi-pole PMG 30 output, the resolver output is converted into an electrical angle. This conversion is accomplished by multiplying the two-pole resolver output by a pair of PMG poles as follows:

$$\varphi = \theta \times P/2$$

where "$\varphi$" is the electrical angle, "$\theta$" is the mechanical (rotor) angle, and "P" is the PMG number of poles. One example of a number of poles of the PMG 30 may be about twenty-eight (28).

The active rectifier 38 of the GCU 32 is coupled to the PMG 30 through contactors 62 and is configured to convert AC power to DC power for the vehicle DC loads 26. To facilitate field oriented control of the active rectifier 38 and enable and/or achieve efficient power conversion over an entire speed range of the prime mover 24, the GCU 32 is configured to determine the actual position of the rotor 56 of the PMG 30 and eliminate or minimize (i.e., compensate for) any errors associated with the actual position. Various sources of rotor position error in the output signals 58, 60 of the resolver 34 may include mechanical misalignment, electrical characteristics and conversion time errors. These errors with a PMG 30 having multiple poles may aggravate accuracy of the electrical angle that should be within at least a one degree (1°) to obtain good control of the power generating system 20.

Figure 3:
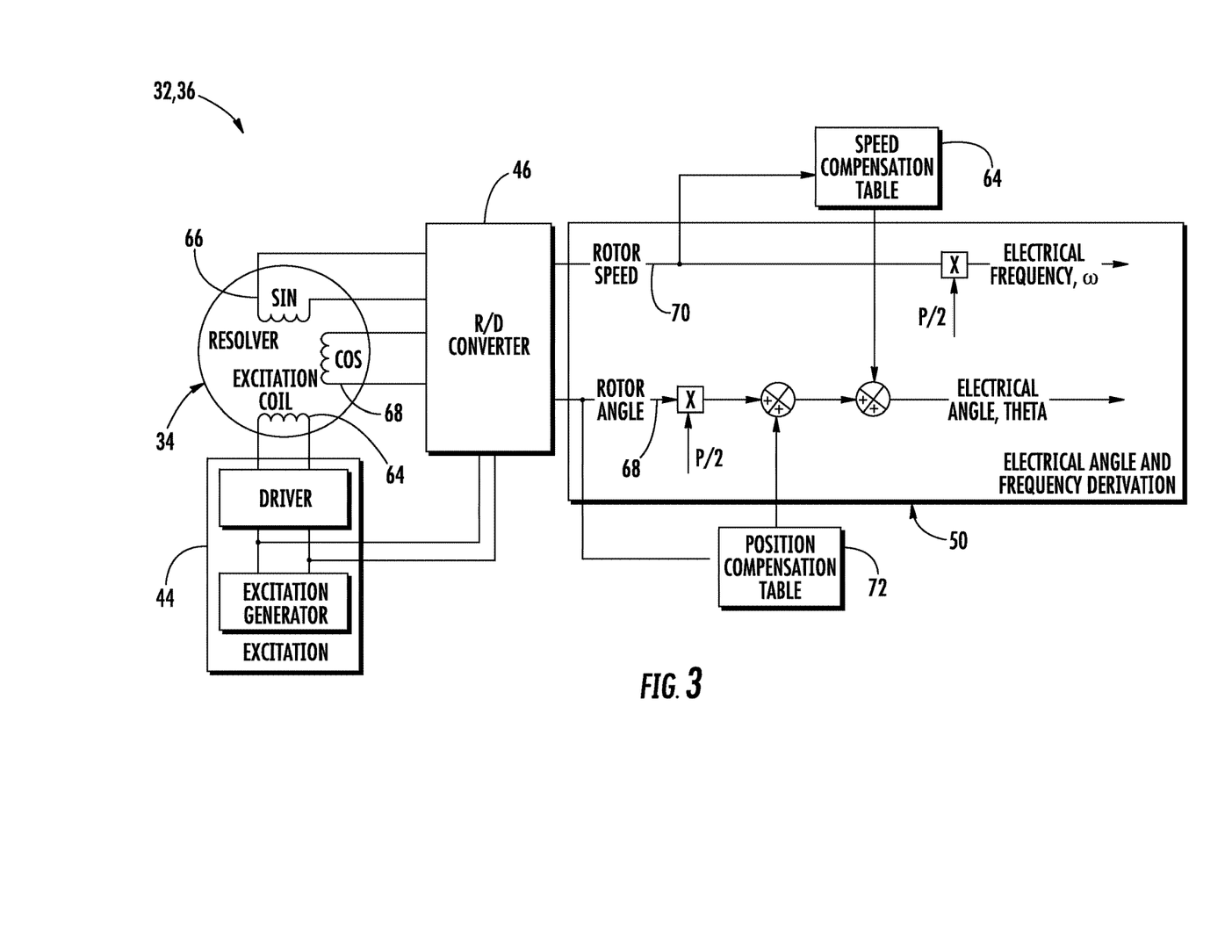
FIG. 3 is a schematic of generator control unit (GCU) of the power generating system.
Figure 4:
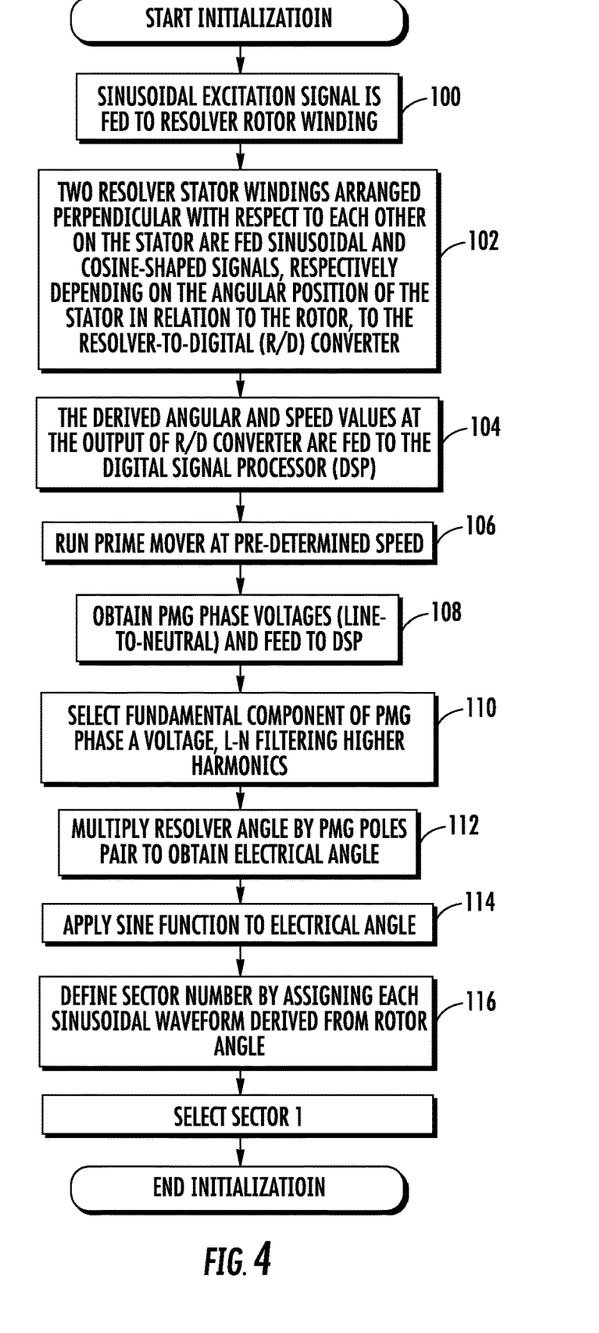
FIG. 4 is a flow chart of a method of initializing a process of a resolver processing and compensation system of the GCU.

The active rectifier controller 38 communicates with the vehicle supervisory controller 28 to enable, for example, different operating modes such as built-in-test, engine start, and/or generate mode. The contactors 62 facilitate disconnect of the active rectifier 38 from the PMG 30 during resolver compensating procedure (i.e., the compensation of rotor position error) and/or during fault conditions. Referring to FIGS. 3 and 4, a method of initializing the resolver compensating procedure may include a block or step 100 that entails feeding a sinusoidal excitation signal to an excitation coil 64 by the excitation component 44 of the resolver processing and compensation system 36. At block 102 sinusoidal and cosine-shaped signals are fed to respective stator coils 66, 68 (i.e., windings) arranged perpendicular with respect to each other on the stator (not shown).

At block 104 of the method of initializing the resolver compensating procedure, angular and speed values (see respective arrows 68, 70) derived by the R/D converter 46 are fed to the electrical angle and frequency derivation component 48 of the DSP component 50, and the speed value 70 may also be fed directly to the processor component 52 of the DSP component 50. At block 106, the prime mover 24 is run at a pre-determined speed. At block 108, PMG 30 phase voltages (i.e., line to neutral) are obtained and fed to the DSP 50. At block 110, higher harmonics are filtered to select a fundamental component of PMG phase A voltage (L-N). At block 112, an electrical angle is obtained by multiplying a rotor angle by the number of PMG pole pairs. At block 114, a sine function is applied to the electrical angle. At block 116, a sector number is defined by assigning each sinusoidal waveform derived from the rotor angle. The sector number may generally be expressed by a sector length that equals 360 degrees divided by the number of pole pairs. In one example, for a PMG having twenty-eight (28) poles and with a two pole resolver, the sector length is as follows:

Sector Length=360°/14=25.714°

In this example, the total sectors is equal to fourteen (14). Electrical angle is aligned in each sector with the PMG phase voltage angular position.

Figure 5:
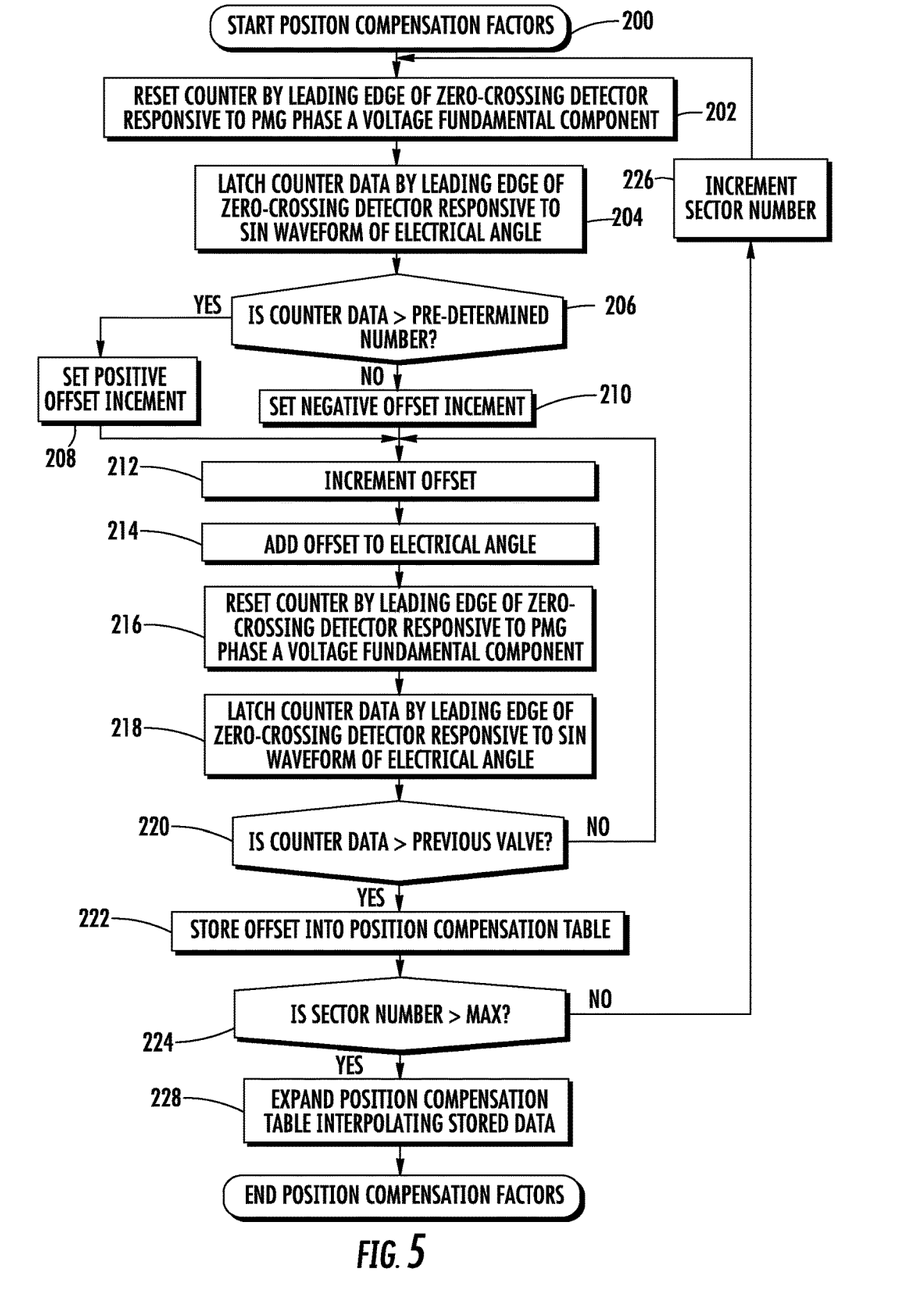
FIG. 5 is a flow chart of a process of compensating for position angle error.

Referring to FIG. 5, an exemplary process of compensating position angle error conducted at least in-part via the DSP component 50, is illustrated. Referring to FIGS. 3 and 5, at block 200 position compensation factor(s) are started. At block 202 a counter is reset by leading edge of zero-crossing detector responsive to PMG phase A voltage fundamental component. At block 204 the counter data is latched by leading edge of zero-crossing detector responsive to sin waveform of electrical angle. At block 206, the processor 52 of the DSP component 50 determines if the counter data is greater than a pre-determined number. If 'yes,' then at block 208 an increment is set to a positive offset value; otherwise, at block 210, the increment is set to a negative offset value. After either of blocks 208, 210, at block 212 the offset is incremented. At block 214, the incremented offset is added to the electrical angle (see block 112 in FIG. 4). At block 216, the counter is reset by leading edge of zero-crossing detector responsive to PMG phase 'A' voltage fundamental component. At block 218 the counter data is latched by leading edge of zero-crossing detector responsive to sine waveform of electrical angle. At block 220, the processor 52 of the DSP component 50 determines if the counter data is greater than previous value. If 'no,' the process returns to block 212; otherwise, at block 222, the offset is stored in a position compensation table 72 stored in memory 54 of the DSP component 50.

At block 224, the processor 52 of the DSP component 50 determines if the sector number is greater than a maximum value. If "no" then at block 226, the sector number is incremented and the process returns to block 202; otherwise, at block 228, the position compensation table is expanded by interpolating stored data.

Figure 6:
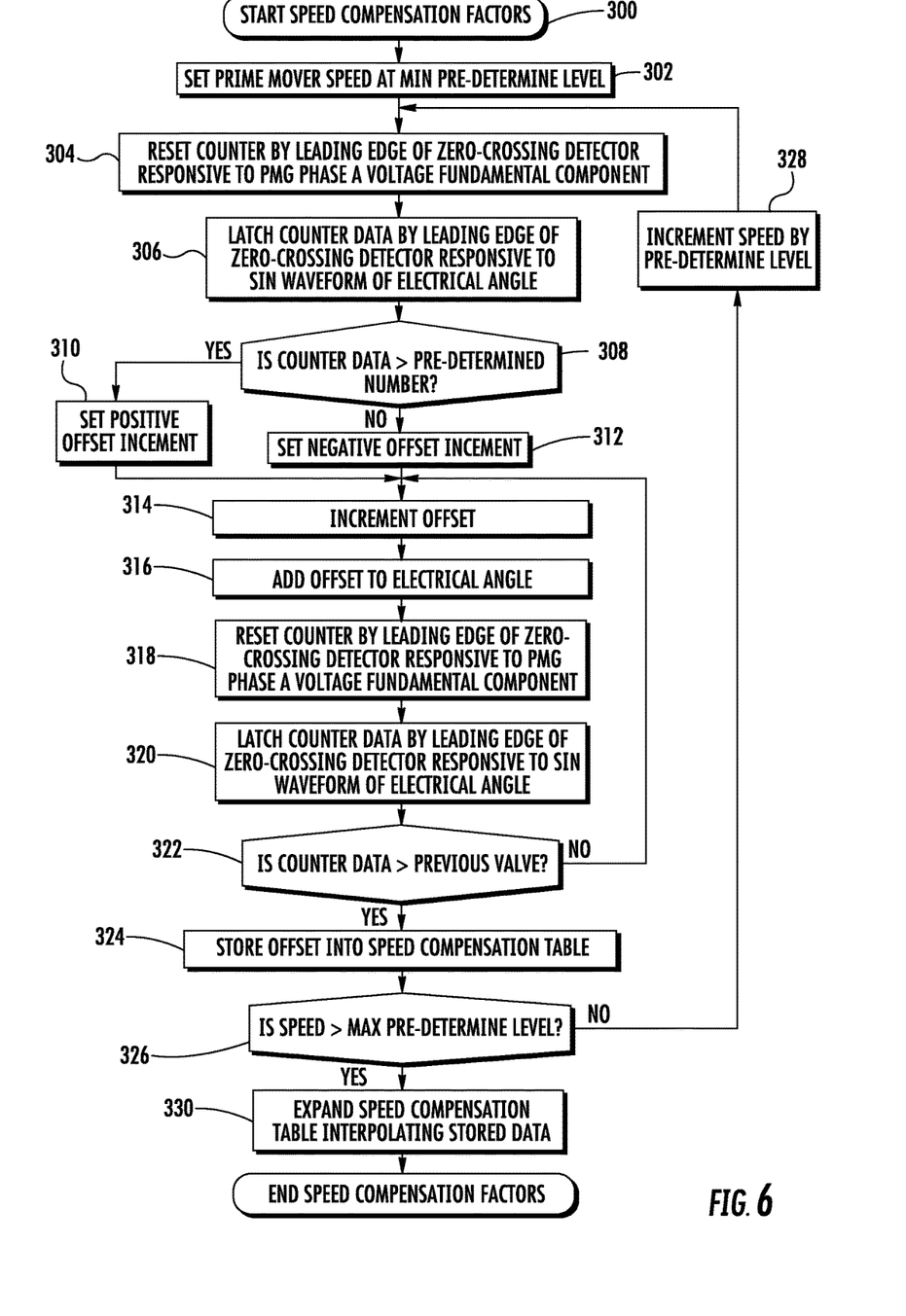
FIG. 6 is a flow chart of a process of compensating for speed angle error.

Referring to FIG. 6, an exemplary process of compensating speed angle error is illustrated. Referring to FIGS. 3 and 6, at block 300, the process of compensating speed angle error utilizing speed compensation factors is started. At block 302, a prime mover 24 speed is set at a minimum pre-determined level. At block 304, a counter is reset by leading edge of zero-crossing detector responsive to PMG phase 'A' voltage fundamental component. At block 306, counter data is latched by leading edge of zero-crossing detector responsive to a sine waveform of an electrical angle. At block 308, the processor 52 of the DSP component 50 determines if counter data is greater than a pre-determined number. If 'yes,' then at block 310, a positive offset increment is set; otherwise, at block 312, a negative offset increment is set.

At block 314, the offset is incremented. At block 316 the incremented offset is added to the electrical angle (see block 112 in FIG. 4). At block 318, the counter is reset by leading edge of zero-crossing detector responsive to PMG phase 'A' voltage fundamental component. At block 320, the counter data is latched by leading edge of zero-crossing detector responsive to sine waveform of electrical angle. At block 322, the processor 52 of the DSP component 50 determines if the counter data is greater than a previous value. If 'no,' then the process returns to block 314; otherwise, at 324 the offset is stored to a speed compensation table 74 stored in memory 54 of the DSP component 50.

At block 326, the processor 52 of the DSP component 50 determines if the speed of the prime mover 24 is greater than a maximum pre-determined level. If 'no,' then at block 328 the speed of the prime mover 24 is incremented by a pre-determined level and the process returns to block 304; otherwise, at block 330 the speed compensation table 64 is expanded by interpolating stored data.

Benefits of the present disclosure include a DC power generating system 20 with a PMG 30 that contains a large number of poles coupled to a two-pole resolver 34, improved PMG rotor angular position information by providing the ability to accurately determine position information and to compensate for positional and speed computational errors, a simplified procedure to compensate resolver error due to mechanical misalignment of a frameless resolver with a generator rotor, and an automated procedure that stores corrected resolver position factor data into a resolver error compensation table(s).

While the present disclosure is described with reference to exemplary embodiments, it will be understood by those skilled in the art that various changes may be made and equivalents may be substituted without departing from the scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of compensating for rotor position error of a rotor of a permanent magnet synchronous generator (PMG) that provides electrical power to a direct current (DC) power generating system, the method comprising:
    obtaining PMG phase voltages and resolver processed angular position output signals by a resolver-to-digital (R/D) converter of the DC power generating system when the PMG is driven by a prime mover;
    filtering the PMG phase voltages by a filter;
    sending the filtered PMG phase voltages to a digital signal processor (DSP) component including at least one computer processor and at least one computer readable storage medium;

selecting a PMG fundamental phase voltage waveform from the filtered PMG phase voltages and by the at least one computer processor;

converting a mechanical angle of a rotor into an electrical angle by the at least one computer processor of an electrical angle and frequency derivation component of the DC power generating system;

aligning the electrical angle within the mechanical angle with a corresponding PMG fundamental phase voltage angle by adjusting offset to the electrical angle;

storing a plurality of resolver error offset values associated with the electrical angle into a computer readable storage medium of the at least one computer readable storage medium;

adding additional values to the compensation table by interpolating data between two corresponding resolver error offset values of the plurality of resolver error offset values by a computer processor of the at least one computer processor; and running the prime mover at a pre-determined speed before obtaining the PMG phase voltages;

further comprising:

feeding an excitation signal to a resolver rotor coil;

feeding sinusoidal and cosine-shaped signals from respective coils of a resolver associated with a rotor of the PMG;

deriving angular and speed values by the R/D converter; and feeding the angular and speed values to the DSP component before running the prime mover;

wherein the resolver comprises a two-pole resolver;

wherein the resolver is frameless; and wherein the PMG includes about twenty-eight poles.

* * * * *